US007088863B2

(12) United States Patent
Averbuch et al.

(10) Patent No.: US 7,088,863 B2
(45) Date of Patent: Aug. 8, 2006

(54) METHOD FOR ILLUMINATION INDEPENDENT CHANGE DETECTION IN A PAIR OF REGISTERED GRAY IMAGES

(75) Inventors: Amir Averbuch, Jaffa (IL); Ofer Miller, Oranit (IL)

(73) Assignee: Infowrap Systems LTD, Jaffa (IL)

( * ) Notice: Subject to any disclaimer, the term of this patent is extended or adjusted under 35 U.S.C. 154(b) by 757 days.

(21) Appl. No.: 09/984,756

(22) Filed: Oct. 31, 2001

(65) Prior Publication Data

US 2003/0190075 A1    Oct. 9, 2003

(51) Int. Cl.
*G06K 9/62* (2006.01)
(52) U.S. Cl. ...................... 382/209; 382/217
(58) Field of Classification Search ............ 382/209, 382/170, 217, 181, 169, 173, 190, 195, 218, 382/219
See application file for complete search history.

(56) References Cited

U.S. PATENT DOCUMENTS 6,028,970 A * 2/2000 DiPiazza et al. ............ 382/309
6,691,126 B1 * 2/2004 Syeda-Mahmood ......... 707/102
6,829,371 B1 * 12/2004 Nichani et al. ............. 382/103

OTHER PUBLICATIONS

Kurt et al. "Illumination independent change detection for real world image sequences", Computer Vision, Graphics, and Image Processing, vol. 46, pp. 387-399, 1989.*
Teasdale et al. "Functional MRI Study of the Cognitive Generation of Affect", American Journal of Psychiatry (GPSI), v156 n2, p. 209-215, p. 7 Feb. 1999.*

* cited by examiner

*Primary Examiner*—Samir Armed
*Assistant Examiner*—Brian Le

(57) ABSTRACT

A method for illumination-independent change detection in a pair of original registered gray images based on blob extraction. Blobs are extracted from the two original images and their negatives, using an enhanced blob extraction algorithm based on connectivity analysis along gray-levels. Blobs extracted from the first original and negative images are compared with blobs extracted from the second original and negative images to determine whether each blob has a corresponding blob, i.e. whether it is a matched or unmatched blob. All unmatched blobs are tested for significance as "blobs of change" using a fitness measure based on either a ratio of saliency gradients, or a product of this ratio and a gradient distribution measure. The disclosed method is exact, fast, robust, illumination-insensitive, and has low time-complexity

15 Claims, 10 Drawing Sheets

$I^{(1)}$ $I^{(2)}$ —104

102

(a)

(b)

(a)

(b)

(c)

(d)

(a)   (b)

$I^{(1)}$   1004          $I^{(2)}$   1002

(a)                              (b)

$I^{(1)}$ 1502

(a)

$I^{(2)}$ (b)

1602

(a)   (b)

1902  1904  1906

(a)           (b)

2002                              2004

(c)           (d)

METHOD FOR ILLUMINATION INDEPENDENT CHANGE DETECTION IN A PAIR OF REGISTERED GRAY IMAGES

FIELD AND BACKGROUND OF THE INVENTION

Change detection between a pair of digital images is used for automatic detection of new blobs appearing in a given scene. A blob is a connected component that has visible local saliency. An object includes one or more blobs. Therefore, in the context of the present invention blob extraction includes extraction of parts or the entire object. In other words, the term object extraction is also covered by the term "blob extraction" as used herein.

The problem of change detection that is addressed herein is defined as follows: a pair of registered gray-level images of the same scene, with different illumination, where each image may contain blobs that are not contained in the other, is given as input. The set of all blobs that do not exist in both images is defined as the change. Prior knowledge about the image, its statistics, and the changes is not given. A typical example is demonstrated in FIG. 1. FIG. 1 shows a pair of images used as inputs to the change detection method. Each image contains a blob that is not contained in the other (e.g. a vehicle 102 in (a) and 104 in (b)). Notice that the images contain the same scenery, under different illumination. If the same blob exists in both images in different locations, it is regarded as a change, since each image contains a blob that is not included in the other. One constraint of the problem is that one would like to locate even small blobs that are composed of ca. 30 pixels.

It is important to emphasize that since non-constant (i.e. different) illumination is assumed between images, methods that are based on image subtraction will yield many false alarms. More sophisticated methods that are based on gray-level surface approximation may fail to detect changes that are caused because of small blobs, since surface approximations tend to smooth the boundaries of the blobs and reduce the ability to detect small blobs

1. Prior Art Methods

Most of the prior art dealing with the problem of identification of change detection does not address the situation of existing non-constant (different) illumination between two images. Many of the prior art works focus on situations of change detection in video. Usually, the illumination in the two images is assumed to be identical. When the change detection in moving video is motivated by compression, the goal is to detect areas of change, and not blobs of change. An area of a change can include parts of a complete blob.

The known techniques for change detection can be classified into the following categories:

| | |
|---|---|
| 1.1 | Pixel-level change detection. |
| 1.2 | Surface modeling. |
| 1.3 | Comparison among derivative images. |
| 1.4 | Contrast invariant representation. |
| 1.5 | Region based comparison of first or higher order statistics. |

All these methods are region based, in contrast with the method of the present invention, which is blob based. The regions are independent of the image content. It is important to note that none of the reviewed prior art methods use segmentation, since exact image segmentation of noisy scenes is very complicated, and it is still considered a difficult problem. Many of the reviewed prior art methods use polynomial approximation on the image surface. This is another drawback, since this approximation smoothes the image, which leads to less accurate results than a blob-based approach.

1.1. Pixel-Level Change Detection

Change between two images or frames can be detected by comparing the differences in intensity values of corresponding pixels in the two frames. An algorithm counts the number of the changed pixels, and a camera break is declared if the percentage of the total number of pixels changed exceeds a certain threshold [R. Kasturi and R. Jain, "Dynamic Vision", *Computer Vision: Principles*, Eds. R. Kasturi, R. Jain, IEEE Computer Society Press, Washington, pp. 469–480, 1991 (hereinafter KAS91); A. Nagasaka, and Y. Tanaka, "Automatic Video Indexing and Full-Video Search for Blob Appearances", *Visual Database Systems, II*, Eds. E. Knuth, and L. M. Wegner, Elsevier Science Publishers B. V., IFIP, pp. 113–127, 1992 (hereinafter NAG92); H. J. Zhang, A. Kankanhalli, and S. W. Smoliar, "Automatic Partitioning of Full-Motion Video", *ACM/Springer Multimedia Systems*, Vol. 1, No. 1, pp. 10–28, 1993 (hereinafter ZHA93)].

Mathematically, the difference in pixels and the threshold calculation can be represented by Eqs. 1 and 2.

$$DP_i(x, y) = \begin{cases} 1 & \text{if } |F_i(x, y) - F_{i+1}(x, y)| > t \\ 0 & \text{otherwise} \end{cases} \quad (1)$$

$$\frac{\sum_{x,y=1}^{X,Y} DP_i(x, y)}{X \times Y} * 100 > T \quad (2)$$

In Eq. 1, $F_i(x,y)$ is the intensity value of the pixel in frame i at the coordinates (x,y). If the difference between the corresponding pixels in the two consecutive frames is above a certain minimum intensity value, then $DP_i(x,y)$, the difference picture, is set to one. In Eq. 2, the percentage difference between the pixels in the two frames is calculated by summing the difference picture and dividing by the total number of pixels in a frame. If this percentage is above a certain threshold T, a camera break is declared.

Camera movement, e.g., pan or zoom, can have an effect of a large number of pixel changes, and hence a segment will be detected. Fast moving blobs also have the same effect. If the mean intensity values of the pixels and their connected pixels are compared [ZHA93], then the effects of the camera and blob motion are reduced.

1.2. Surface Modeling

Here the idea is to model the gray-level surface of a pair of images such that the surface of the errors between the images is negligible. Hsu Y. Z., Nagel H. H, and Rekers G., "New likelihood test methods for change detection in image sequences", *Computer Vision Graphics Image Processing*, vol. 26, pp. 73–106, 1984 (hereinafter HSU84)] model the gray-level surface by patches of a second order bivariate polynomial in the pixel coordinates. Given two corresponding regions, $R_1(x_0,y_0)$ in the image $I^{(1)}$ and $R_2(x_0,y_0)$ in $I^{(2)}$, they represent each region by a set of seven parameters—the six coefficients of the quadratic polynomial patch, and the sum of square differences between the polynomial patch and the gray-levels. Under the assumption that the approximating patch represents the gray-level surface up to uncorrected noise errors, a likelihood test to the two hypotheses is made:

H$_0$: R$_1$(x$_0$,y$_0$) and R$_2$(x$_0$,y$_0$) come from the same gray-value distribution.

H$_0$: R$_1$(x$_0$,y$_0$) and R$_2$(x$_0$,y$_0$) come from different gray-value distributions.

This method is not adequate to handle changes in illumination in the pair of images, as shown in Skifstad Kurt and Jain Ramesh, "Illumination Independent Change Detection for Real World Image Sequences", *Computer Vision, Graphics, and Image Processing*, Vol. 46, pp. 387–399, 1989 (hereinafter SKI89).

1.3. Comparison among Derivative Images

These methods are based on the derivative images instead of working on the original gray-level images. A version of this concept is used by [SKI89]. They partition the image into regions, and each surface in each region is approximated by polynomials. Then, the derivatives of each patch are computed. If the images of the derivatives are denoted by I$^{(D1)}$ and I$^{(D2)}$, then a threshold is used in order to create a binary image from the image of differences, I$^{(D1)}$–I$^{(D2)}$. Areas of change are supposed to be white regions in this binary image. This method is inadequate for noisy inputs.

1.4. Contrast—Invariant Representation

Another method that can be used to perform change detection is described in P. Monasse, F. Guichard, "Fast Computation of a Contrast-Invariant Image Representation", IEEE Trans. on Image Processing, Vol. 9, No. 5, 860–872, 2000 (hereinafter MON00). This paper sets out a new representation of an image, which is contrast-independent. The image is decomposed into a tree of "shapes" based on connected components of level sets, which provides a full and un-redundant representation of the image. This method, which is based on invariance under change of contrast, can be used to perform some kind of change detection between images that have different illumination. However, the formulation of the solution using a level set method cannot handle efficiently many blobs at the same time.

1.5. Region Based Comparison of First or Higher Order Statistics

The input images are divided into regions, usually squares of m×m pixels. Denote by R$_1$(x$_0$,y$_0$) the square in the image I$^{(1)}$ that its center is the pixel with coordinates (x$_0$,y$_0$), and similarly denote by R$_2$(x$_0$,y$_0$) the corresponding square in the image I$^{(2)}$. The gray-levels in the region R$_1$(x$_0$,y$_0$) are normalized such that the mean gray-level and the variance of the gray-levels of R$_1$(x$_0$,y$_0$) are the same as the mean and variance gray-level of R$_2$(x$_0$,y$_0$). Then, the image I$^{(2)}$ is compare to the image I$^{(1)}$. The normalization process of this statistical method is supposed to be a variation of illumination correction.

The shading model method was suggested by SKI89. Each gray-level is basically the product of two components: (1) the amount of source light incident on the scene and (2) the amount of light reflected by the blobs in the scene. The amount of source light incident on a small region of the scene is approximately uniform, but the reflected light of two adjacent blobs may be different. Denote by i(x$_0$,y$_0$) the amount of source light incident on point (x$_0$,y$_0$) in the scene, and by r(x$_0$,y$_0$) the amount of reflected light from the point (x$_0$,y$_0$) in the scene. Let I$^{(1)}$ and I$^{(2)}$ be two images with corresponding functions, i$_1$(x,y), i$_2$(x,y), r$_1$(x,y) and r$_2$(x,y). If at pixel (x$_0$,y$_0$) both images contain the same blob, then the following is satisfied:

$$\frac{I^{(1)}(x_0, y_0)}{I^{(2)}(x_0, y_0)} \approx \frac{i_1(x_0, y_0) \cdot r_1(x_0, y_0)}{i_2(x_0, y_0) \cdot r_2(x_0, y_0)} = \frac{i_1(x_0, y_0)}{i_2(x_0, y_0)} \quad (3)$$

since the amount of reflected light from point (x$_0$,y$_0$) depends on the blob itself. Let F be the image of real numbers that is the result of the division of the two images, I$^{(1)}$ and I$^{(2)}$, that is:

$$F^{Def} = \frac{I^{(1)}}{I^{(2)}} \quad (4)$$

where F is assumed to have accuracy of real numbers. Let R$_F$(x$_0$,y$_0$) be a small neighborhood around the point (x$_0$,y$_0$) in the image F. Then, for a point (x0,y0) that belongs to the same blob in both images, I$^{(1)}$ and I$^{(2)}$, the surface patch that is composed of the values in the region R$_F$(x$_0$,y$_0$) is expected to be a smooth and slow varying surface, since the change of the illumination in a small region is slow-varying. On the other hand, for a pixel (x$_0$,y$_0$) that belongs to a different blob in each image, the surface patch that is composed of the values in R$_F$(x$_0$,y$_0$) is expected to be much less smooth, since the region R$_F$(x$_0$,y$_0$) can include a transition from one blob to another. The method in [SKI89] proposes to examine the variance in each pixel (x$_0$,y$_0$) of the region R$_F$(x$_0$,y$_0$). If the variance is higher than some pre-specified threshold, then the pixel is considered as belonging to a region of change. The change detection mask of this method is defined for each pixel by the following formula:

$$E\{\sigma^2\} = E\left\{\frac{1}{N}\sum_{x \in A_i}\left(\frac{I_{x1}}{I_{x2}} - \mu_i\right)^2\right\} = \frac{1}{N}\sum_{x \in A_i}\left(E\left\{\frac{I_{x1}}{I_{x2}}\right\} - E\{\mu_i\}\right)^2 > 0 \quad (5)$$

where $\mu_i$ is the average value of the ratio of intensities, E is the expectation, N is the size of the image, and "A" is a 5×5 region. Among all the other reviewed methods, this method, and the statistical method that will be introduced in the next paragraph, are the only ones that address directly the problem of change in illumination. This method is based on the assumption that the division of the images cancels the difference in the illumination between the two images, which does not always hold in practice. Moreover, the variance inside a region R$_F$(x$_0$,y$_0$), whose size is not based on the image content, adds inaccuracies of its own.

Another method of statistical model-based change detection was proposed by Til Aach, Andre Kaup and Rudolf Mester, "Statistical model-based change detection in moving video", *Signal Processing*, Vol. 31, pp. 165–180, 1993 (hereinafter AKM93). Given two successive frames I$_{(k)}$ and I$_{(k+1)}$, let $$d_k=(x, y)=I_{k+1}(x, y)+I_k(x, y) \quad (6)$$

denote the image of gray level differences between frames I$_{(k)}$ and I$_{(k+1)}$. Under the $$p(d_k(x, y)|H_0 = \frac{1}{\sqrt{2\Pi \sigma^2}} e^{\left\{-\frac{d_k^2}{2\sigma^2}\right\}}$$

hypothesis than no changes occurred at position (x,y) (the null hypothesis $H_0$), the corresponding difference $d_k(x,y)$ follows a zero-mean Gaussian distribution where the noise variance $\sigma^2$ is equal to twice the variance of the camera noise, assuming that the camera noise is white. Rather than performing the significance test on the values $d_k(x,y)$, it is better to evaluate a local sum of normalized differences:

$$\Delta_k(x, y) = \sum_{(x',y') \in w(x,y)} \frac{d_k^2(x', y')}{\sigma^2} \quad (8)$$

where w(x,y) is a window of observation centered at (x,y). Under the assumption that no changes occur within the windows, the normalized differences $d_k/\sigma$ obey a Gaussian distribution N(0,1) and are spatially uncorrelated. Thus, the local sum $\Delta_k(x,y)$ follows a $x^2$ distribution with N degrees of freedom, N being the number of pixels within the windows w(x,y). With the distribution $p(\Delta_k(x,y))$ known, a decision rule for each pixel can obtained by a significance test on $\Delta_k(x,y)$. For a specific level α one can compute a corresponding threshold $T_\alpha$ using:

$$\alpha = P_r\{\Delta_k(x, y) > T_\alpha|H_0\} \quad (9)$$

The significance level α is in fact the false alarm rate associate with the statistical test. The higher the value of α, the more likely is the classification of unchanged pixels as change. It is obvious that the significance test depends on the noise variance $\alpha^2$. Thus, an accurate estimate of the noise variance is crucial for performance of the test. To ensure that, the variance is estimated only within the background region of the current frame, to remove the influence change region. The background regions are determined according to the tracked mask of the previous frame. One of the problems of this concept is the initial step when the background regions are not yet known: it requires a heuristics method that is strongly based on a threshold for estimating the background region.

The likelihood ratio approach is suggested based on the assumption of uniform second-order statistics over a region [KAS91; N. H. Nagel, "Formulation of a blob concept by analysis of systematic time variation in the optically perceptible environment", *Computer Graphics and Image Processing*, Vol. 7. pp. 149–194, 1978 (hereinafter NAG78); ZHA93]. The frames can be subdivided into blocks, and then the blocks are compared on the basis of the statistical characteristics of their intensity levels. Eq. (10) represents the formula that calculates the likelihood function. Let $\mu_i$ and $\mu_{i+1}$ be the mean intensity values for a given region in two consecutive frames, and $\sigma_i$ and $\sigma_{i+1}$ be the corresponding variances. The number of the blocks that exceed a certain threshold t are counted. If the number of blocks exceeds a certain value (dependent on the number of blocks), a segment is declared. A subset of the blocks can be used to detect the difference between the images so as to expedite the process of block matching.

$$\lambda = \frac{\left(\left[\frac{\sigma_i + \sigma_{i+1}}{2} + \left(\frac{\mu_i - \mu_{i+1}}{2}\right)^2\right]\right)^2}{\sigma_i \times \sigma_{i+1}} \quad (10)$$

$$Dp_i(k, l) = \begin{cases} 1 & \text{if} \quad \lambda > t \\ 0 & \text{otherwise} \end{cases}$$

$$\text{If} \quad \frac{\sum_{x,y=1}^{X,Y} DP_i(x, y)}{X \times Y} * 100 > T$$

a camera break is declared. This approach increases the tolerance against noise associated with camera and blob movement. It is possible that even though the two corresponding blocks are different, they can have the same density function. In such cases no change is detected.

Another method based on statistical computations was suggested by Sze-Chu Liu, Chang-Wu Fu, and Shyang Chang, "Statistical change detection with moments under time-varying illumination", *IEEE Transactions On Image Processing*, Vol. 7, No. 9, September 1998 (hereinafter SZE98). The proposed method consists of two parts. First, based on the defined circular shift moments, this method tries to distinguish the structural changes from those caused by illumination in a noise-free case, which is mentioned by [SKI89]. Moreover, the amount of computation in calculating higher-order circular shift moments can be reduced via a set of iterative formulae. Therefore, the time required for the computation is less than that of the shading model [SKI89]. Second, in accordance with the characteristics of the defined moments, SZE98 also propose a statistical decision rule to cope with the effects of noise. The change detection problem can be treated as one of hypothesis testing. Critical values are determined according to the desired level of significance. This does not perform change detection well, and there are many "false alarms".

There is thus a widely recognized need for, and it would be highly advantageous to have, a fast and robust illumination-insensitive method for extracting blobs that appear in only one of a pair of images, a method that has a low time complexity, and is exact, robust and fast.

SUMMARY OF THE INVENTION

According to the present invention there is provided a method for illumination-independent change detection between a pair of registered images, comprising: a) providing a first original gray-level image, a second original gray-level image, a first negative image related to the first original image and a second negative images related to the second original image, b) extracting respective pluralities of blobs from each of the first and second original images and each of the first and second negative images, c) matching each extracted blob in the first original and negative images with each extracted blob in the second original and negative images to obtain matched and unmatched blobs, and d) testing all the unmatched blobs to identify blobs of change, whereby the blobs of change indicate a change detected by a method that is exact, fast, robust, illumination-insensitive and has low time-complexity.

According to the present invention there is provided a method for change detection in images, comprising: a) providing a pair of first and second registered gray level images, b) extracting respective first and second pluralities of blobs from each of the images using a modified connectivity along gray levels (CAG) analysis, c) locating at least one unmatched blob in at least one of the images, and d) identifying at least one blob of change related to the images by applying a test on the at least one unmatched blob.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
FIG. 1 shows a pair of images used as input to the change detection method. The images contain the same scenery, under different illumination, and each image contains a blob that is not contained in the other.
Figure 1:

The present invention is of a method to extract blobs that appear in only one of two images of any registered pair of images. Specifically, the present invention can be used for illumination-independent change detection in a pair of gray images based on connectivity analysis along gray-levels. The principles and operation of a method to extract blobs that appear in only one of two images according to the present invention may be better understood with reference to the drawings and the accompanying description.

The first step (the blob extraction step) of the present invention is preferably based on algorithm for blobs extraction based on connectivity analysis along gray-levels (CAG) as shown in Pikaz Arie, "Connectivity Analysis in Digital Gray-Levels Images and Its Applications", Ph.D. thesis, Tel-Aviv University, Israel, February 1998 (hereinafter PIK98). The original CAG algorithm is preferably used herein as a starting point for detecting, with an appropriate set of parameters, all visually conspicuous blobs. It is worthwhile pointing out that the CAG algorithm does not deal with change detection. Thus, all the steps of the present method beyond the blob extraction step are novel.

The change detection method of the present invention works in general as follows: Let $I^{(1)}$ and $I^{(2)}$ be the input gray-level images. Denote by $\{C_i^{(1)}\}_{i=1}^{N_1}$ the set of $N_1$ blobs that where detected and extracted by the blobs extracting algorithm in image $I^{(1)}$, and similarly by $\{C_j^{(2)}\}_{j=1}^{N_2}$ the set of $N_2$ blobs that were detected and extracted in $I^{(2)}$. The blobs that define the change belong to either $\{C_i^{(1)}\}_{i=1}^{N_1}$ or $\{C_j^{(2)}\}_{j=1}^{N_2}$. The original problem of change detection is reduced to the problem of detecting blobs in the set $\{C_j^{(2)}\}_{j=1}^{N_2}$ that are not included in the set $\{C_i^{(1)}\}_{i=1}^{N_1}$ and vice versa. A perfect match between corresponding blobs is not expected. More than that, several blobs from one image may be connected or united into a big blob in the other image (thus, even if no change occurred, the values $N_1$ and $N_2$ might be different). For each blob in $\{C_i^{(1)}\}_{i=1}^{N_1}$ the change detection method searches for a corresponding blob in $\{C_j^{(2)}\}_{j=1}^{N_2}$, and vice versa. Recall that the pair of images is registered, thus the coordinates of the corresponding blobs should be the same in both images. If sufficient number of pixels of both blobs has the same coordinates ("sufficient" is determined by a pre-defined parameter), the examined pair of blobs is considered as a match. If not, then the blob from one image is "marked" in the second image. The image gradients along its boundary are examined. A measure of saliency is defined according to the distribution of the magnitudes of these gradients. If this saliency measure is sufficiently high, then the blob is classified as existing in both images. Otherwise, it represents a change. The proposed change detection method is very efficient and robust, and it is adequate for real-time applications.

2. The Original CAG Blob Extraction Algorithm

Given a digital gray-level image I, $I_t$ denotes a binary image that is the result of thresholding image I with a threshold t. In a binary image, a segment is defined as a set of black pixels in which there exists a 4-connected path of black pixels between each two pixels of the set. It is clear that a binary image can be represented by the set of all segments that it contains. A gray-level image I with G gray-levels can be represented by the set $\{I_t\}_{t=0,\ldots,G-1}$ of G binary images.

Figure 2:
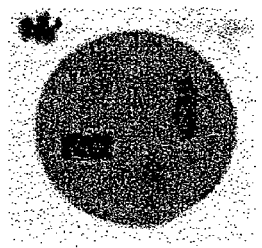
FIG. 2 shows (a) the original input image and (b) extracted blobs bounded by white curves.
Figure 2:
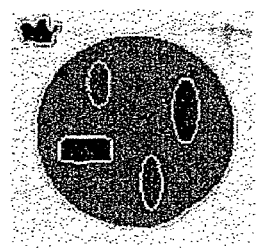

FIG. 2 (taken from PIK98) shows (a) an original input image and (b) extracted blobs bound by white curves. We call the blobs, which are the outputs of the CAG algorithm, significant blobs.

Generally, a blob in a gray-level image is visually conspicuous if one or more of the following exist:
1. The gray-levels inside the blob are considerably different from the gray-levels of the local background of the blob.
2. Most of the magnitudes of the gradients that correspond to pixels along the blob boundary, are higher than the magnitudes of the gradients that correspond to pixels in the local background.
3. The texture inside the blob is considerably different from the texture of the local background of the blob.

The CAG algorithm deals with blobs that satisfy the first two conditions. It is assumed that for each significant blob there exists a threshold value t such that the blob is a connected segment in $I_t$.

Let $C_i^{(t)}$ be the $i^{th}$ connected-segment in the binary image $I_t$. For a value $\tilde{t} > t$ there exists a (single) connected segment $C_j^{(\tilde{t})}$ in the binary image $I_{\tilde{t} \text{ that contains } Ci}^{(t)}$. If we consider t as a time parameter, connected segments spread out as the time advances. As t increases, connected segments are united into larger connected segments until finally, for t=G-1, the whole image becomes one connected segment.

For any given significant blob O there exists a sequence of segments $(C^{(t)})_{t=t_0}^{G-1}$, where $C^{(t)}$ is a connected segment in $I_t$, that satisfies the following:
1. If t'<t" then $C^{(t')} \subseteq C^{(t")}$
2. There exists a value $\tilde{t} \geq t_0$ such that $O \subseteq C^{(\tilde{t})}$.

Figure 3:
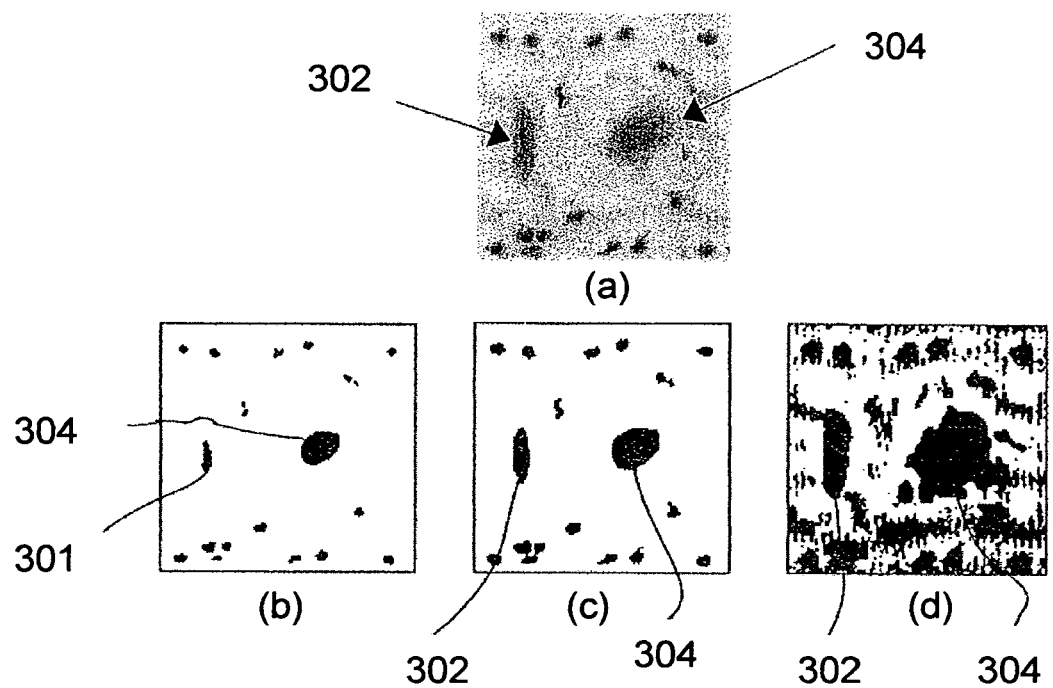
FIG. 3 shows (a) an exemplary gray-level image, (b) its binary image $I_{120}$, (c) its binary image $I_{140}$ and (d) its binary image $I_{190}$.

There is a value of t (or sub-interval of values) for which $C^{(t)}$ represents best the significant blob. If t is too small, the corresponding segment $C^{(t)}$ is only an inner part of the blob. If t is too large, the blob is an inner part of $C^{(t)}$. The spread-out of connected segments of $I_t$ as t is increased is demonstrated in FIG. 3, which is also taken from [PIK98A]. FIG. 3(a) presents a binary image $I_{120}$ (that is, t=120) that contains segments that are only part of "real" blobs 302 and 304. The binary image in FIG. 3(c), $I_{140}$, corresponds to a value of t=140, for which $I_t$ best represents the two significant blobs 302 and 304 from FIG. 3(a). FIG. 3(d) presents $I_{190}$ that contains segments that are larger than the "real" blobs 302 and 304.

As part of the blob extraction process, the threshold value t that corresponds to each significant blob has to be detected automatically. For this purpose, we define a weight function that is attached to each segment. The weight is a function of the threshold parameter t. It is denoted by $w_c(t)$, where C is the relevant segment. The function $w_c(t)$ is defined as follows: in the binary image $I_t$ there exists at most a single segment C' that satisfies C'∩C≠∅. The value of $w_c(t)$ is defined as the average value of the gradient magnitudes along the boundary of the segment C'.

We choose the gradient magnitude as the weight of each pixel. The weight of a blob is defined as the average weight of the pixels along the blob boundary. This weight is expected to be proportional to the blob saliency, defined hereinbelow. Let $C^{(\tilde{t})}$ be a segment that corresponds to a "real blob". Its weight is expected to be the maximal weight among the weights of all the clusters that are not disjoint to $C^{(\tilde{t})}$. Any connected cluster $C^{(t)}$ satisfies one of the following: $C^{(t)} \cap C^{(\tilde{t})} = \emptyset$, or $C^{(t)} \subseteq C^{(\tilde{t})}$ and then $t \leq \tilde{t}$ or $C^{(\tilde{t})} \subseteq C^{(t)}$ and then $\tilde{t} \leq t$.

The weight function $w_c(t)$ is expected to have local maxima at values of t that correspond to the binary image $I_t$ that contains the significant blob. For illustration, the weight function that corresponds to blob 304 in FIG. 3(a) is presented in FIG. 4.

A weight is attached to each pixel in the input gray-level image I. The weight that is attached to a pixel is a measure of edge saliency. In particular, a pixel that resides on an edge gets assigned a higher weight than a non-edge pixel. A reasonable choice for the image of weights is the magnitudes of the gradients of I. There are many ways to compute an approximation of the gradient at a pixel. We preferably approximate the gradient vector at a pixel (u,v) according to $$\left( \frac{f(u+1,v) - f(u,v) + f(u+1,v+1) - f(u,v+1)}{2}, \right.$$
$$\left. \frac{f(u,v+1) - f(u,v) + f(u+1,v+1) - f(u+1,v)}{2} \right) \quad (11)$$

where $f(u,v)$ is the gray-level of the pixel at column u and row v in the image I. Denote the image of the magnitudes of the gradients by $I^{(MAG)}$. For a given pixel $p_i = (u_i, v_i)$ let $w(p_i)$ be the intensity value at column $u_i$ and row $v_i$ in the image $I^{(MAG)}$. The weight of a given segment C is defined by $$w(C) \stackrel{def}{=} \frac{1}{|\partial C|} \sum_{q \in \partial C} w(q) \quad (12)$$

where $\partial C$ is the set of boundary pixels of the segment C and $|\partial C|$ is the size of this set. A pixel q is defined as a boundary pixel of the segment C if it belongs to C and at least one of its four nearest neighbors does not belong to C. The definition in Eq. 13 has the following convenient property. The weight of the union of a segment C with a segment that is composed of a single pixel can be computed in a constant number of operations. Let p be a pixel that is united with the segment C. Let C' be the result of the union between the segment C and {p}. The weight of C' satisfies $$w(C') = \frac{w(C) \cdot s(C) + w(p) - \sum_{q \in \partial C \text{ and } q \notin \partial C'} w(q)}{s(C) + 1} \quad (13)$$

where s(C) is the number of pixels that are contained in segment C. It is clear that the set {q|q∈∂C and q∉∂C'} is composed only of pixels that are nearest-neighbors of the pixel p. Therefore, only a constant number of operations is required to compute $$\sum_{q \in \partial C \text{ and } q \notin \partial C'} w(q).$$

The same is true for w(C').

If an examined blob O corresponds to a connected segment C in a binary image $I_t$, then its gray-levels must differ from the gray-levels of its local background. From the definition of the function $w_c(t)$ we conclude that if a local maximum of $w_c(t)$ exists at point $\tilde{t}$, then the blob O is salient related to its local background. Thus, the combination of connectivity and gradients along the boundary of the connected segments is a powerful measure of the significance of a given blob.

3. The Change Detection Algorithm

3.1 Modifications of the CAG Blob Extraction Algorithm

Figure 4:
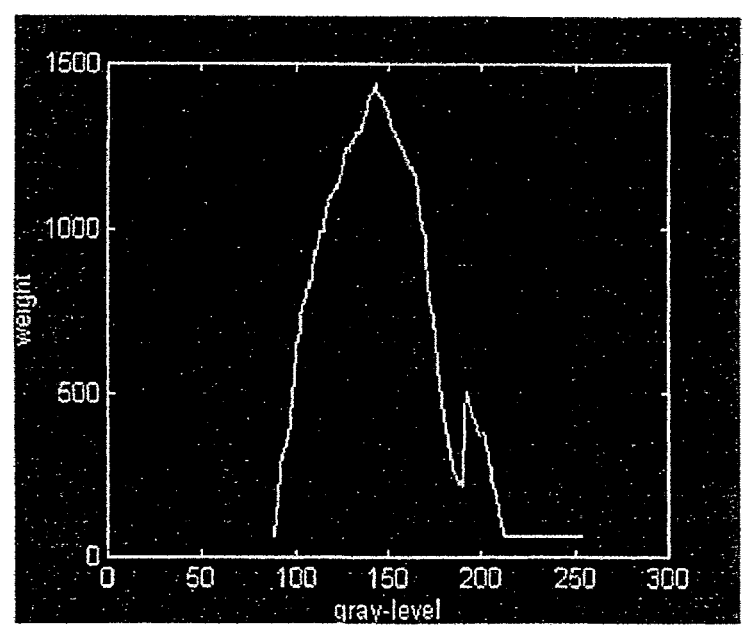
FIG. 4 illustrates a weight function that corresponds to blob 304 in FIG. 3. The local maximum is achieved with a threshold t=142.

The change detection starts with a novel and much more efficient method and algorithm of the present invention disclose a much more efficient way to extract blobs than the original CAG algorithm in PIK98. The present invention significantly adds to, and substantially enhances the capabilities of the original CAG algorithm with the following features: 1) the CAG of the present invention selects the conspicuous blobs based on local considerations; 2) local considerations are added to the original algorithm so that the analysis of the image is more reliable; 3) the present algorithm is more robust, this being achieved by changing the formulae and computations of local weights. 4) the computation of connected components is based herein on lower and upper bounds, which increases the accuracy of the detected blobs. In the original CAG algorithm, this computation was based only on a lower bound, which could not guarantee the accuracy of the detected blobs. The use of lower and upper bounds yields an enhanced detection capability for very small blobs, on the order of ca. 30 pixels. As suggested in the original CAG algorithm, the lower bound is computed by increasing the value of the threshold t from 0. This yields a binary image according to the threshold t. Then a weight is computed according to Eqs. 11 and 12. As t increases, one gets a monotonically increasing function until t reaches the maximum. This is illustrated in FIG. 4. This maximum is the value of the final threshold, but may be wrong because it is based on gray level values to which it is very sensitive. In order to eliminate this sensitivity, in the algorithm of the present invention we compute the threshold t in the same way as above, but starting from 255 and decreasing the value by 1 each time step; and 5) major data structures are herein modified and added to support the above enhancements, and to increase the efficiency of the algorithms. For example, for the task of a much more efficient search, we preferably use herein the data structure of "Union-find for handling set disjoint structures" [Cormen Thomas, Leiserson Charles, Rivest Ronald, *Introduction to ALGORITHMS*, The MIT Press, 1990, chapter 22 (hereinafter COR90)]. The construction and analysis of all the connected segments through the G gray-levels is done in a worst case time complexity of $O(\alpha(n,n) \cdot n)$, where $\alpha(n,n)$ is the inverse of the Ackerman function, which is almost a constant [COR90], and n is the number of pixels in the image I. Therefore, we devise an almost linear time complexity algorithm.

3.2—Steps of the Change Detection Method

Within the change detection method of the present invention, the modified blob extraction algorithm is first applied on two input images $I_1$ and $I_2$ (herein "original" images), and on their negatives $\overline{I_1}$ and $\overline{I_2}$. The outputs are four lists of blobs, $SOL_1$, $\overline{SOL_1}$, $SOL_2$ and $\overline{SOL_2}$. The upper bar means "negative". $SOL^1$ is a first unified list that contains the union $SOL_1 \cup \overline{SOL_1}$ (i.e. all extracted blobs in $SOL_1$ and $\overline{SOL_1}$) and $SOL^2$ is a second unified list that contains the union $SOL_2 \cup \overline{SOL_2}$. The lists $SOL^1$ and $SOL^2$ contain all the candidate blobs of change that exist in images $I^{(1)}$ and $I^{(2)}$, respectively. The idea is to find for each blob in $SOL^1$ a matched blob in $SOL^2$, and then for each blob in $SOL^2$ a matched blob in $SOL^1$. The method for change detection of the present invention is presented first in general steps in a block diagram in FIG. 5, with a detailed description of each step given later.

Figure 5:
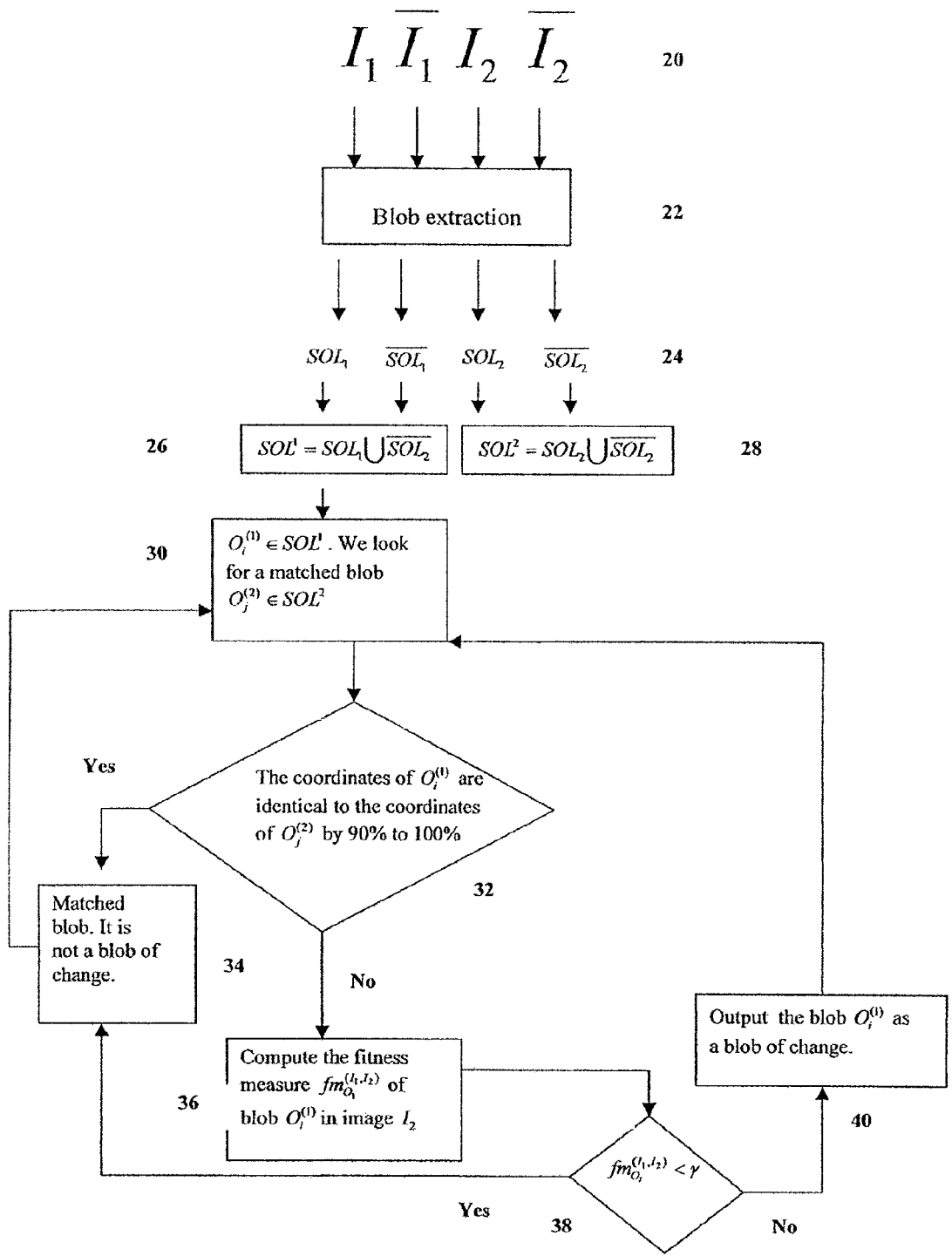
FIG. 5 is a block diagram showing a preferred embodiment of the method for change detection of the present invention.

FIG. 5 shows a block diagram of a preferred embodiment of the method of the present invention. There are no input parameters, and no need for any other prior knowledge regarding the input images. The change detection is performed between two images $I_1$ and $I_2$. Therefore, the inputs are four images 20: $I_1$, $I_2$ and their negatives $\overline{I_1}$ and $\overline{I_2}$, respectively.

A blob extraction step 22 is separately applied on each of the input images $I_1$, $I_2$ and their negatives $\overline{I_1}$, and $\overline{I_2}$. Each application produces as output a list of extracted significant blobs 24. Thus, there are four lists denoted by $SOL_1 = \{C_i^{(1)}\}_{i=1}^{n_1}$, $\overline{SOL_1} = \{\overline{C_i^{(1)}}\}_{i=1}^{m_1}$, $SOL_2 = \{C_i^{(2)}\}_{i=1}^{n_2}$, $\overline{SOL_2} = \{\overline{C_i^{(2)}}\}_{i=1}^{m_2}$ resulting from the application of the blob extraction on $I_1$, $\overline{I_1}$, $I_2$, and $\overline{I_2}$ respectively. Note that the connected segments in each of the four lists are disjoint, but there might be a pair of connected segments from $SOL_1$ and $\overline{SOL_1}$ (and similarly, from $SOL_2$ and $\overline{SOL_2}$) with non-empty intersection. The assumption is that each blob of change exists in one of the four lists, $SOL_1$, $\overline{SOL_1}$, $SOL_2$ and $\overline{SOL_2}$. Each list of extracted blobs contains information, for example geometrical information in the form of pixel locations, on each blob in the list. An example is shown in FIG. 6.

Figure 6:
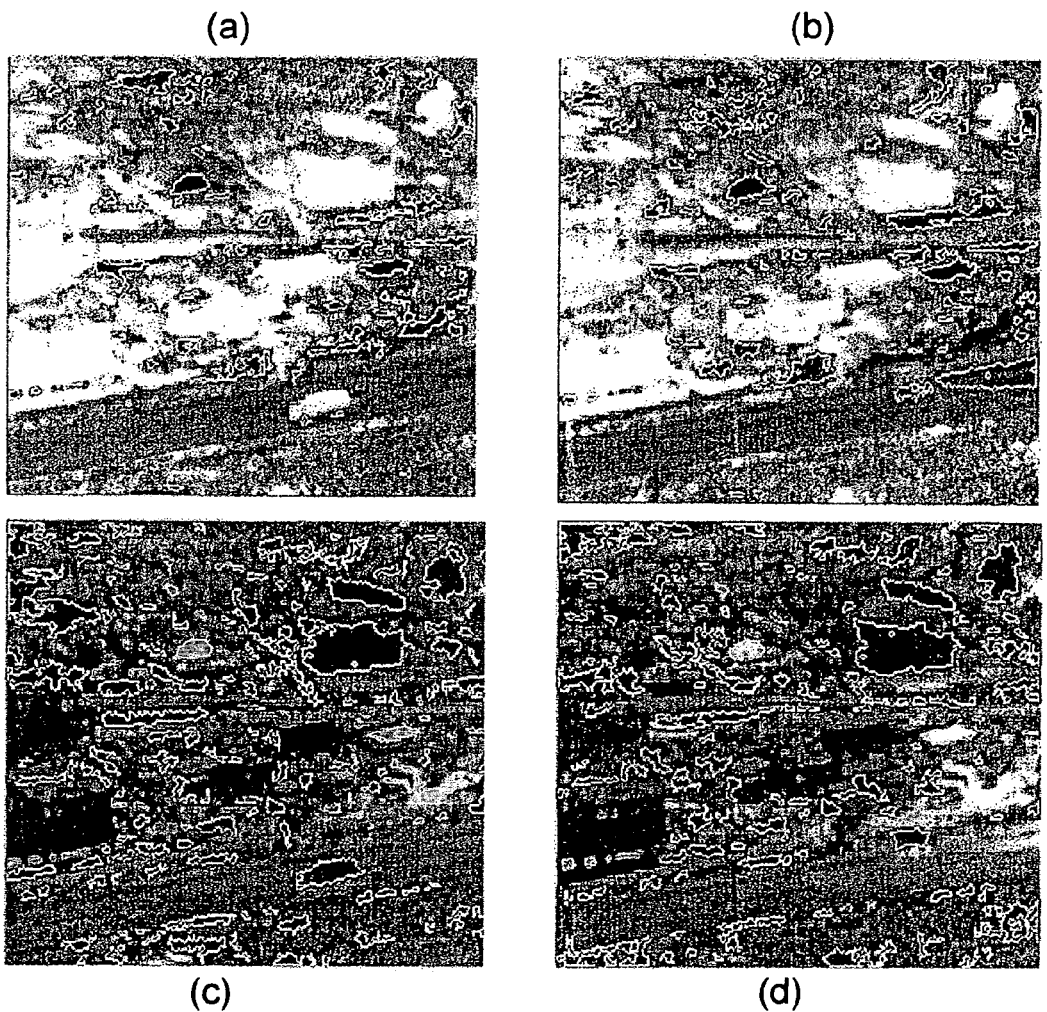
FIG. 6 shows the outputs of the algorithm for extracted blobs of the present invention, for the images in FIG. 1.

FIG. 6 shows the four output lists ("outputs") of the blob extraction step for the pair of images of FIG. 1. The extracted blobs are bound by white curves. r is the radius of the search, $s_{min}$ and $s_{max}$ are the minimum and maximum of the size of the blob, respectively and w is the weight of the blob computed by Eq. 13. In the particular example shown here, the parameters value are: r=4, $s_{min}$=10 pixels, $s_{max}$=1000 pixels, and w=20. The algorithm is stable and insensitive to the exact choice of the parameters: FIG. 6 shows in (a) all the extracted blobs from the right image of FIG. 1 (list $SOL_1$); in (b) all the extracted blobs from the left image of FIG. 1 (list $SOL_2$); in (c) same as (a), but performed on a negative image (list $\overline{SOL_1}$); and in (d) same as (b), but performed on a negative image (list $\overline{SOL_2}$). Note that $SOL_1$ (a) and similarly $\overline{SOL_1}$ (b) contain blobs that have no corresponding blob in $SOL_2$ (c) and $\overline{SOL_2}$ (d). As explained below in section 3.3, the lists contain only blobs that are candidates for being classified as "blobs of change".

Next, in a first unification step 26, lists $SOL_1$ and $\overline{SOL_1}$ are preferably united in into first unified list $SOL^1 = SOL_1 \cup \overline{SOL_1}$ that contains the blobs from both lists $SOL_1$ and $\overline{SOL_1}$. Similarly, lists $SOL_2$ and $\overline{SOL_2}$ are preferably united in a second unification step 28 into second unified list $SOL^2 = SOL_2 \cup \overline{SOL_2}$ that contains the blobs from both lists $SOL_2$ and $\overline{SOL_2}$. Next we follow one path relating to matching blobs in $SOL^1$ with blobs in $SOL^2$ after step 26, with the understanding that the same procedure is applicable after step 28, for each blob $O_i^{(2)}$ in $SOL^2$, while replacing the roles of the list $SOL^1$ with the list $SOL^2$.

In a matching step 30, unique to the present invention, each blob $O_i^{(1)}$ in $SOL^1$ is trial matched with a blob $O_j^{(2)}$ in $SOL^2$. If blobs $O_i^{(1)}$ and $O_j^{(2)}$ overlap (have the same coordinates) by at least $\alpha$ % of pixels (where $\alpha$ ranges typically from 75% to 100%, and preferably between 90–100%, i.e. where preferably the lower bound of $\alpha$ is about 90%) then a logical check step 32 checks that blob $O_i^{(1)}$ also exists in $SOL^2$. A logical yes answer in checking step 32 leads to a "no change" step 34 that determines that this is not a blob of change. This leads back (loop) to step 30 where another blob is taken from the list. If the answer in step 32 is a logical no, the algorithm proceeds to another novel step, unique to the present invention: a fitness-measuring step 36, which computes a fitness measure $fm_{o_1}^{(I_1,I_2)}$ of blob $O_i^{(1)}$ in $SOL^2$. The fitness measure is then compared to a pre-defined parameter (threshold) $\gamma$ in a comparison step 38. If $fm_{o_1}^{(I_1,I_2)} < \gamma$, then blob $O_i^{(1)}$ is determined as existing in both images (yes), i.e. this is not a blob of change, and the algorithm proceeds back to step 30 to process another blob. If $fm_{o_1}^{(I_1,I_2)} > \gamma$ (no) then the blob is declared in a step 40 as a blob that exists in one list and not in the other. Therefore, this is a blob of change, and the algorithm returns to process another blob in step 30.

The parameter $\gamma$ is preferably between 0 and 1, and most preferably about 0.6.

3.3. Determination of Match Between Corresponding Blobs

In the following there is a detailed description of a preferred embodiment of a process of matching blobs in $SOL^1$ with blobs in $SOL^2$. The same procedure is valid for the match among blobs in $SOL^2$ and blobs in $SOL^1$. Let $O_i^{(1)}$ be a blob from $SOL^1$. The matching procedure is composed of two phases.

Phase 1 (Steps 30 and 32 in FIG. 1)—$O_i^{(1)}$ has a Corresponding Blob in $SOL^2$ We look for a matched blob $O_j^{(2)}$ in $SOL^2$. In an ideal situation, each pixel of $O_j^{(2)}$ has a corresponding pixel in $O^{i(1)}$ with identical coordinates, but usually this is not the case. In our implementation we claim that the two blobs $O^{j(2)}$ and $O_i^{(1)}$ match if the coordinates of at least $\alpha$ % of the pixels from both blobs are identical. In real experiments, a is typically chosen to be 90.

Figure 7:
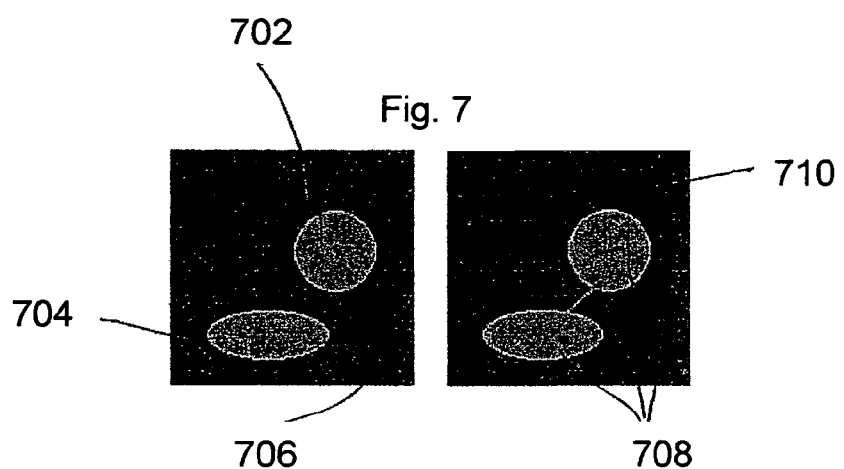
FIG. 7 is an illustration of a problem of a lack of matching between blobs, as demonstrated by synthetic blobs that might not be matched in the first step of the matching process of the change detection method

It is possible that the blob $O_i^{(1)}$ has no matching blob in $SOL^2$ but it has a corresponding blob in the image $I^{(2)}$. An example for such a case is shown in FIG. 7 that presents a pair of images with synthetic blobs in (a) and (b), in which there are no "blobs of change". FIG. 7 is an illustration of the problem as demonstrated by synthetic blobs that might not be matched in the first step of the matching process of the change detection algorithm (step 30). As can be seen, no change exists in the given pair of gray-level images, but the images are not exactly the same. The output of the blob extraction algorithm for the left image (a) will contain three blobs—a circle 702, an ellipse 704 and a background 706. On the other hand, the output of the blob extraction algorithm for the right image (b) will contain only two blobs—one blob 708 composed of the circle, the ellipse and the very thin line that connects them, and another blob 710 representing the background. Thus, blob 702 from the right image has no matching blob, according to matching step 30 of the matching process.

Phase 2 (Steps 36 and 38 in FIG. 5)—A Corresponding Blob not Found in $SOL^2$

Next, we deal with all the blobs that remain unmatched after the first step. If a blob in one image exists also in the other image, then its saliency measure must be sufficiently high also in the second image. The saliency measure of a blob is a function of the magnitudes of the gradients of its boundary pixels. In the original CAG algorithm, the saliency measure of a blob O with boundary $\partial O$ was defined as:

$$sal(O; I) \stackrel{Def}{=} \frac{1}{|\partial O|} \sum_{(x,y) \in \partial O} |\nabla I(x,y)| \qquad (14)$$

where $|\partial O|$ is the number of boundary pixels, $\nabla I(x,y)$ is the gradient vector of the image I at pixel (x,y) and $|\nabla I(x,y)|$ is the magnitude of the gradient. The saliency measure of a blob $O_i^{(1)}$ in an image $I^{(2)}$ is computed according to the gradient values of the pixels $(x,y) \in \partial O_i^{(1)}$ in image $I^{(2)}$. In the example of FIG. 7, the saliency measure of each of the two blobs 702 and 704 in the left image (a) will be also high in right image (b). Then, the value $sal(O_1^{(1)}; I^{(1)})$ is expected to be close to $sal(O_1^{(1)}; I^{(2)})$, and similarly, the value $sal(O_2^{(1)}; I^{(1)})$ is expected to be close to $sal(O_1^{(1)}; I^{(2)})$.

For each blob $O_i^{(1)}$ of $SOL^1$ that remains unmatched after the first step, we perform the following: assume, without loss of generality, that $O_i^{(1)}$ is contained in $SOL^1$. Compute the values $sal(O_i^{(1)}; I^{(1)})$ and $sal(O_i^{(1)}; I^{(2)})$. If the ratio $$sm_{o_1}^{(I_1,I_2)} = \frac{sal(O_i^{(1)}; I^{(1)})}{sal(O_i^{(1)}; I^{(2)})} \qquad (15)$$

is sufficiently high (above some pre-defined threshold), the blob $O_i^{(1)}$ is declared as an "blob of change". Otherwise, analysis of a second order statistic is required.

3.4 The use of Gradient Distribution Vector for the Matching Process

Assume $|\partial O| = n$. Let $\{i_1, \ldots, i_m\}$ be the indices of the pixels in $\partial O$ with gradient magnitude greater than the sal(O;I). Then, the indices of the m pixels, $i_1, \ldots, i_m$, should be uniformly distributed.

Let:

$$P_k \stackrel{Def}{=} \frac{i_{k+1} - i_k}{n} \quad k = 1, \ldots, n-1$$

and $$P_n \stackrel{Def}{=} \frac{n - 1 - i_n + i_1}{n} \quad k = n = m.$$

It is clear that for each k, $$p_k \in \left[\frac{1}{n}, 1\right],$$

and:

$$\sum_{k=1}^{m} p_k = 1.$$

Denote by E the entropy of $p_1, \ldots, P_m$, that is:

$$E = -\sum_{k=1}^{m} p_k \cdot \log p_k. \tag*{}$$

The maximal entropy is achieved when $p_k$ are uniformly distributed: $p_k=1/m$. Denote by $E_m$ this maximal entropy value, that is:

$$E_m = -\sum_{k=1}^{m} \frac{1}{m} \cdot \log \frac{1}{m}.$$

When there are more $p_k$ s that are uniformly distributed we get higher value for the gradients distribution and it is denoted by:

$$dst_O^{(l)} \stackrel{Def}{=} \frac{E}{E_m} = \frac{E(p_1, \ldots, p_m)}{-\sum_{k=1}^{m} \frac{1}{m} \cdot \log \frac{1}{m}} \tag{16}$$

$m/n > \gamma$ where $\gamma \in [0,1]$. We preferably choose $\gamma$ to be 0.6. Eq. 15 enables to determine whether the blob is a change when the $sm_o^{(I_1,I_2)}$ function yields a value that is less than $\beta$, hence the "distribution-measure" of the gradients is defined as:

$$dm_{o_1}^{(I_1,I_2)} = \begin{cases} \frac{dst_{o_1}^{(I_1)}}{dst_{o_1}^{(I_2)}} & sm_{o_1}^{(I_1,I_2)} \leq \beta \\ 1 & \text{else} \end{cases} \tag{17}$$

where the ratio in $dm_{o_1}^{(I_1,I_2)}$ (Eq. 17) along the gradients boundary pixels is considered only if $sm_{o_1}^{(I_1,I_2)}$ (Eq. 15) is less than $\beta$ and $\beta \in [0,1]$. We preferably choose $\beta$ to be 0.6.

3.5 The Fitness Measure

The fitness measure, denoted by fm, constitutes the foundation for the second phase of the matching phase, and contains the functions in Eqns. 15 and 17 above:

$$fm_{o_1}^{(I_1,I_2)} = sm_{o_1}^{(I_1,I_2)} * dm_{o_1}^{(I_1,I_2)} \tag{18}$$

fm enables to decide whether blobs exist in both images or only in one of them. According to the definition of (Eq. 17), when the value of sm (Eq. 15) is higher than $\beta$fm will be based only on the ratio of the $sm_o^{(I_1,I_2)}$ functions. Otherwise, the multiplication of dm (Eq. 17) with sm (Eq. 15) intends to offset the outcome of $sm_o^{(I_1,I_2)}$ when two blobs are attached to each other, and thus prevent a misdetection of the attached blob. This happens only when the value of $sm_o^{(I_1,I_2)}$ is low. Therefore, the fitness measure is defined as $fm_{o_1}^{(I_1,I_2)}$, which verifies whether the blob O(i) in $I^{(1)}$ also exists in $I^{(2)}$:

4. Implementation of the Change Detection Algorithm

4.1 The Pseudo-code

Input: Let $I^{(1)}$ and $I^{(2)}$ be the inputs pair of registered gray-levels images. Let $\overline{I^{(1)}}$ and $\overline{I^{(2)}}$ be the negative images.

Output: $SOL^{(out)}$ are the list of the output blobs, that is, the final list of "blobs of change". $SOL^{(out)}$ is initialized to be an empty list.

Process:
1. Apply the blob extraction algorithm (section 3) on images $I^{(1)}$ and $\overline{I^{(1)}}$ in order to get the output lists of significant blobs, $SOL_1$ and $\overline{SOL_1}$ respectively. Denote the unified list $SOL_1 \cup \overline{SOL_1}$ by $SOL^1$. Similarly, construct unified list $SOL^2$.
2. For each blob $O_i^{(1)}$ in $SOL^1$ do:
   2.1. Let $p=(x_i,y_i)$ be a representative pixel of $O_i^{(1)}$. Assume, without loss of generality, that $O_i^{(1)}$ was extracted from $I^{(1)}$ (and not from $\overline{I^{(1)}}$) Let $O_j^{(2)}$ be the blob in $I^{(2)}$ that contains the pixel p.
   2.2. If the blobs $O_i^{(1)}$ and $O_j^{(2)}$ are overlapped by at least $\alpha$ % of pixels (chose preferably $\alpha$=90) then blob $O_i^{(1)}$ also exists in $O_j^{(2)}$.
   2.3. Else, compute $fm_{o_1}^{(I_1,I_2)}$ (the fitness measure of blob $O_i^{(1)}$ in image $I^{(2)}$). The values of $sal(O_i^{(1)};I^{(2)})$ and $sal(O_i^{1};I^{(1)})$ are computed by using the contour following algorithm [Jain Anil K., *Fundamentals of Digital Image Processing*, Prentice-Hall, 1989, chapter 9.5 (hereinafter JAI89)], starting with a boundary pixel of $O_i^{(1)}$ and $O_i^{(2)}$).
   If $fm_{o_1}^{(I_1,I_2)} < \gamma$, where $\gamma$ is a pre-defined parameter valued between 0 and 1, and preferably about 0.6, then blob $O_i^{(1)}$ exists in both images.
   Else (that is, if $fm_{o_1}^{(I_1,I_2)} \geq \gamma$) mark blob $O_i^{(1)}$ as a blob that appears in image $I^{(1)}$ and not in image $I^{(2)}$. Then, insert $O_i^{(1)}$ into $SOL^{(out)}$.
3. Repeat step 2 for each blob $O_i^{(2)}$ in $SOL^2$, while replacing the roles of image $I^{(1)}$ with image $I^{(2)}$.

The worst-case complexity of this pass is linear in the number of pixels of the blob.

4.2. Complexity Analysis

The overall time complexity of the algorithm is almost linear in the image size, n. Specifically, it is $O(n \cdot \alpha(n,n))$, where $\alpha(n,n)$ is the inverse of the Ackermman function [COR90, chapter 22.4], which is almost a constant. Following is the time complexity analysis of each of the three steps listed above in 5.1. The numbers correspond to the step numbers that appeared in the pseudo-code description.

The construction of each of the four SOL lists takes $O(n \cdot \alpha(n,n))$ operations in the worst-case, where $\alpha(n,n)$ is the inverse of the Ackermman function. Therefore, the worst-case time complexity for the creation of $SOL^1$ and $SOL^2$ is $O(n \cdot \alpha(n,n))$.
1. In the following we compute the complexity analysis of steps 30 and 32 in FIG. 5. The computations are related to all the blobs of $SOL^1$ and $SOL^2$ are linear in the total number of pixels. Since the union of all the blobs in one image is not larger than the image size, the time complexity of all the iterations of this step will be O(n). Following is a detailed description of the time complexity of all stages of this part:
   1.1. Given a pixel p, the blob that contains it can be found in O(1) operations by simply keeping an array of n entries such that entry i points to the pixel who is the head of the class.
   1.2. In order to find the percentage of matching pixels between two blobs, a single pass on both of them is required. This pass is linear in the number of pixels of the blob.
   1.3. The boundary of each blob is extracted by a single pass on the boundary pixels, using the contour-following algorithm [JAI89, chapter 9.5). All that is required is a pixel that is known to reside on the boundary. Such a pixel is attached in advance to each blob, as part of the output of the blob extraction algorithm. The worst-case time complexity of computing the saliency/fitness measure of blob $O_i^{(1)}$ in the image $I^{(2)}$ is linear in the number of boundary pixels.

2. As in part 2, the worst-case time complexity is O(n).

5. Experimental Results

In this section we present four examples, and analyze the performance of the change detection algorithm. The first example, in section 5.1, presents the complete process of the change detection algorithm. In section 5.2 we demonstrate the robustness of the algorithm, and its insensitivity to change in the illumination. In section 5.3, we focus on step 36, FIG. 5 of the matching procedure. In section 5.4 the proposed method is compared to the "Shading Model" method, which is one of the methods that explicitly deal with significant changes in the luminance, as reviewed above.

5.1 Example I

Figure 8:
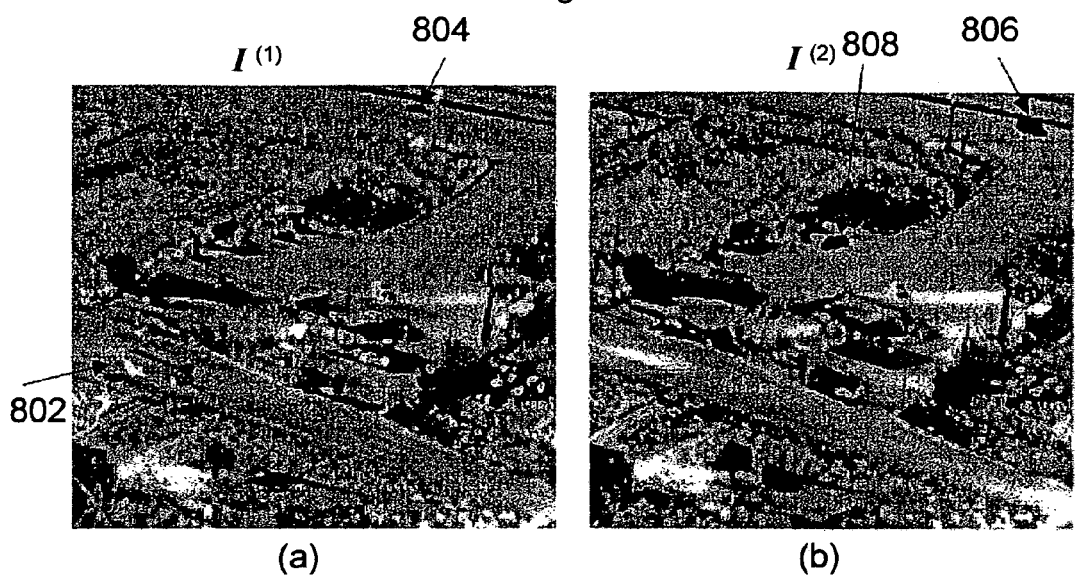
FIG. 8 shows an exemplary pair $I^{(1)}$ and $I^{(2)}$ of infrared input images.

FIG. 8 shows a pair of InfraRed registered input images. The left image $I^{(1)}$ in (a) contains two blobs (a bus 802 at the bottom and a vehicle 804 at the top) that are not contained in the right image $I^{(2)}$ in (b). Image $I^{(2)}$ contains two blobs (a vehicle 806 at the top and a vehicle 808 in the middle) that are not contained in $I^{(1)}$; These are four potential "blobs of change".

Figure 9:
FIG. 9 shows the absolute differences between the images $I^{(1)}$ and $I^{(2)}$ of FIG. 8.
Figure 10:
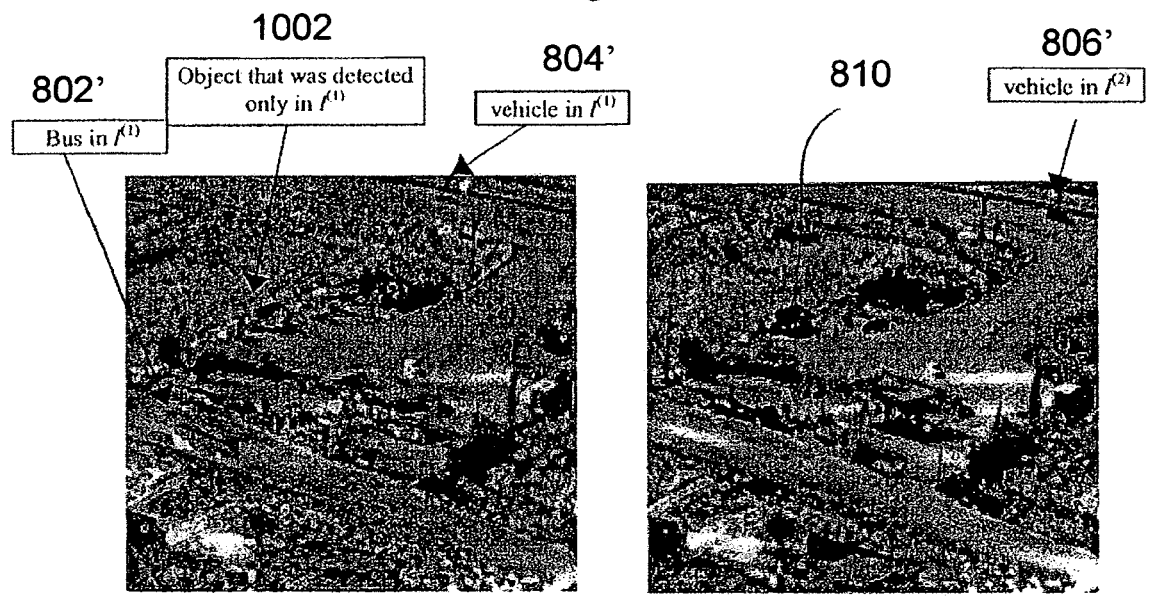
FIG. 10 shows the blobs that belong to the $SOL^1$ and $SOL^2$ lists, drawn on the FIG. 8.

FIG. 9 shows a difference image of images $I^{(1)}$ and $I^{(2)}$ from FIG. 8 in which it is seen that the change in the illumination between $I^{(1)}$ and $I^{(2)}$ is significant FIG. 10 shows the blobs that belong to the lists $SOL^1$ and $SOL^2$, drawn on FIG. 8. The two vehicles of $I^{(1)}$ (802' and 804') and the top vehicle of $I^{(2)}$ (806') are pointed by the arrows. The list $SOL^1$ also contains a blob 1002. We can see in the same location in $I^{(2)}$ the same blob (marked as blob 810). However, blob 810 was not found by the blob extraction that was applied on $I^{(2)}$. In other words, the blob corresponding to blob 1002 was not detected at all by the blob-extraction algorithm, even though it appears in $I^{(2)}$.

Figure 11:
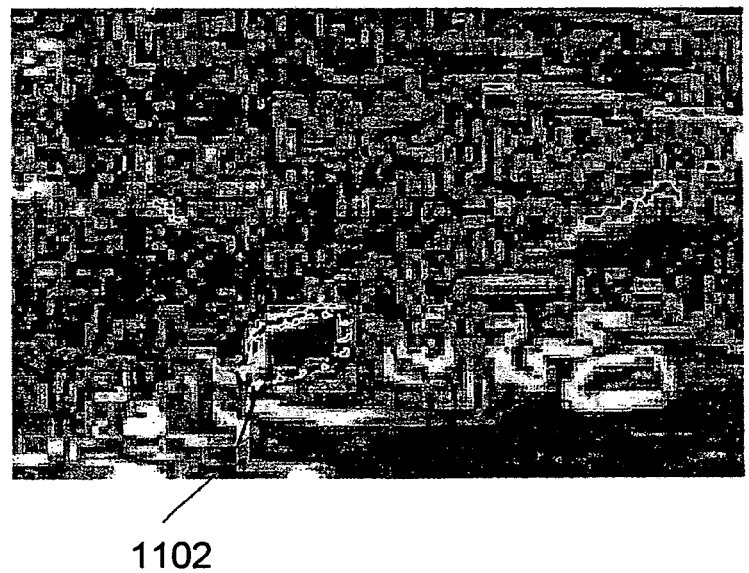
FIG. 11 shows the boundary of a blob in FIG. 10, marked by a dotted line, laid over the gradient magnitudes of $I^{(2)}$.

Blobs in $SOL^1$ that have no corresponding blobs in $SOL^2$ (e.g. blob 1002) with α % (α=90) of overlap (the first step in the matching phase) are passed to step 36 in FIG. 5. The same is done with blobs in $SOL^2$ that have no corresponding blobs in $SOL^1$. In step 36, FIG. 5, saliency and fitness measures for each blob in $SOL^1$ are computed in $I^{(2)}$, and vice-versa. If the saliency measure of any blob from $I^{(1)}$ is sufficiently high in $I^{(2)}$, (e.g. blob 1002) then this saliency measure is represented in the image of gradient magnitudes of $I^{(2)}$ by a dotted contour, e.g. a dotted contour 1102 in FIG. 11, which corresponds to blob 810 in FIG. 10.

Figure 12:
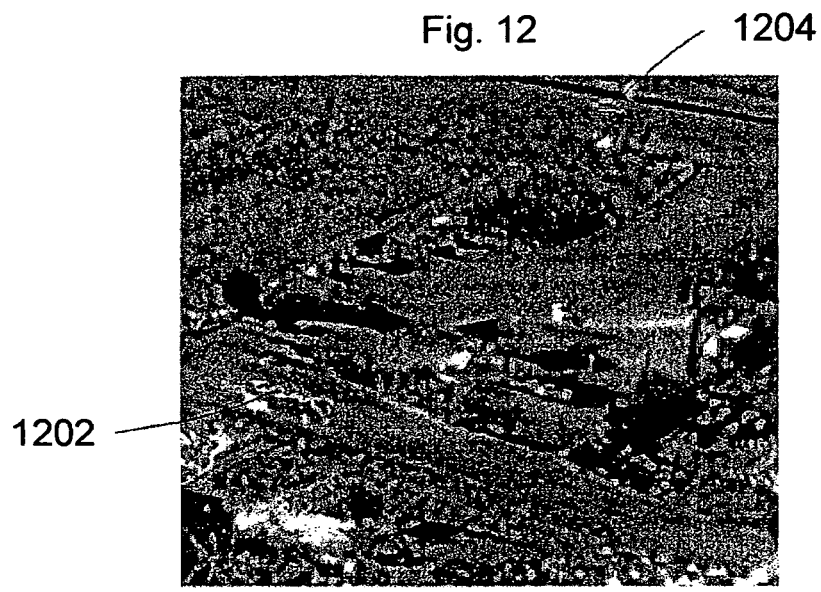
FIG. 12 shows the result of the change detection method after comparison between $I^{(1)}$ and $I^{(2)}$ from FIG. 8.

In view of the test above (step 36), the blobs that correspond to the two vehicles in $I^{(1)}$ (802 and 804 in FIG. 8) have no matched blobs since their saliency measure in $I^{(2)}$ is low. Therefore, they output as "blobs of change". FIG. 12 shows the result of the change detection algorithm that represents the changes in $I^{(1)}$ relatively to $I^{(2)}$. The two blobs in $I^{(1)}$, which do not exist in $I^{(2)}$, are marked 1202 and 1204.

5.2. Example II

Figure 13:
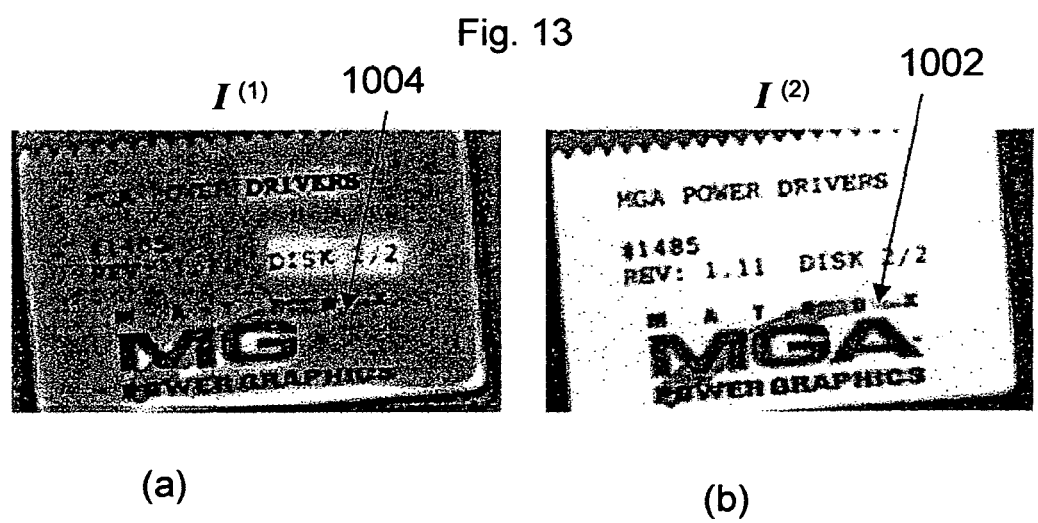
FIG. 13 shows another example illustrating the effect of different illumination between two images.

This example demonstrates the robustness and the insensitivity of the algorithm of the present invention to change in illumination. Two generated images $I^{(1)}$ (a) and $I^{(2)}$ (b) having extreme differences between their illuminations are shown in FIG. 13. A capital letter "A" is indicated by an arrow 1302 in (b). Capital letter "A" was omitted from $I^{(1)}$ (an arrow 1004 in (a)) in order to make it the "blob of change".

Figure 14:
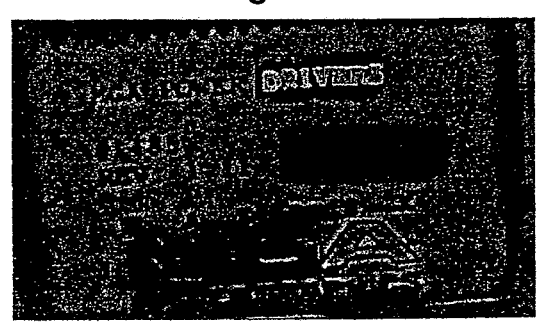
FIG. 14 shows a difference image $|I^{(1)}-I^{(2)}|$ related to FIG. 13.

FIG. 14 shows a difference image $|I^{(1)}-I^{(2)}|$ related to FIG. 13. The subtraction between the two input images $I^{(1)}$ and $I^{(2)}$ demonstrates a significant difference in the illumination.

Figure 15:
FIG. 15 shows the outputs $SOL^1$ and $SOL^2$ relating to FIG. 13 marked on $I^{(1)}$ and $I^{(2)}$, respectively.
Figure 15:
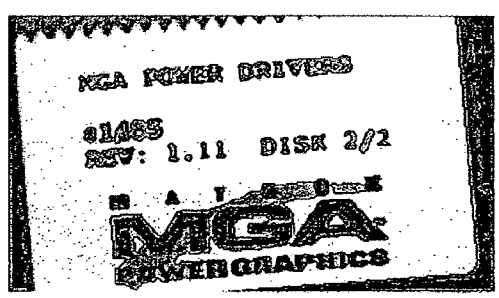

Step 24 (FIG. 5) of the change detection algorithm outputs the extracted blobs. FIG. 15 shows the outputs (a) $SOL^1$ and (b) $SOL^2$ relating to FIG. 13, marked on $I^{(1)}$ (a) and $I^{(2)}$ (b), respectively. Letters 1502 that compose the word "DISK 2/2" in $I^{(1)}$ were deliberately omitted from $SOL^1$ in order to demonstrate the robustness of the change detection algorithm.

Figure 16:
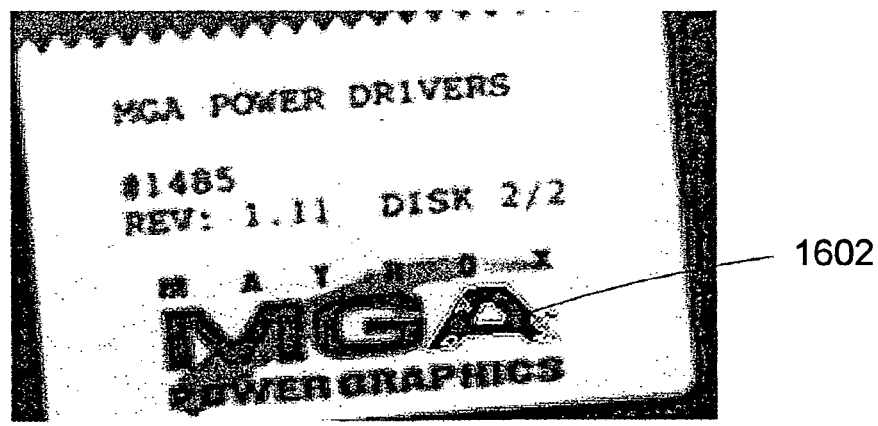
FIG. 16 shows the output from the change detection method after its application on FIG. 15.

In matching step 30, each blob in $SOL^1$ is searched for a corresponding blob in $SOL^2$, and vice versa. Seven blobs that correspond to the letters "DISK 2/2", and the blob for capital letter "A" in $SOL^2$ (FIG. 15b) have no corresponding blobs found in $SOL_1$ (FIG. 15a). Each of these eight blobs is checked again in step 36. In this step, the saliency and the fitness measures in $I^{(1)}$ for each "non-matched" blob in SOL2 is computed. The only blob in $SOL^2$ that has saliency and fitness measures in $I^{(1)}$ with a higher value than γ (section 5.1), is the capital letter "A". This blob indeed does not exist in $I^{(1)}$. Thus, the output of the change detection is the blob composed of the pixels of the letter "A". This is shown in FIG. 16, which shows the capital letter "A" as a blob of change 1602.

5.3. Example III

Figure 17C:
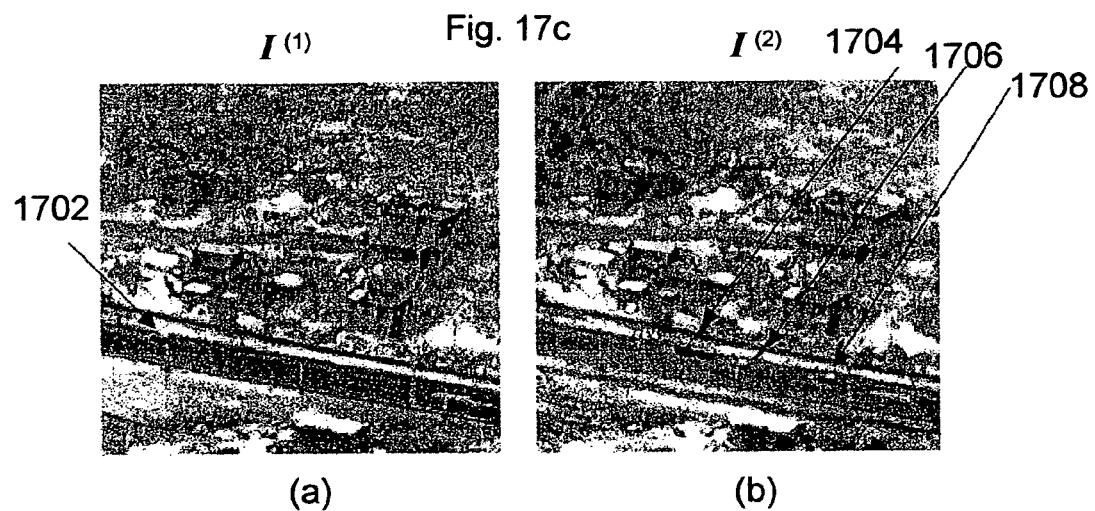
FIG. 17 shows another example of two input images $I^{(1)}$ and $I^{(2)}$.

In this example we focus on the "fitness measure" as described above. FIG. 17 shows two input images $I^{(1)}$ in (a) and $I^{(2)}$ in (b). The blobs of change are a vehicle 1702 in $I^{(1)}$, and three vehicles 1704, 1706 and 1708 in $I^{(2)}$. The outputs $SOL^1$ and $SOL^2$ (not shown) of each image contain 116 blobs. In this example we show that the fitness measure for blobs in $SOL^2$ that also appear in $SOL^1$, is much higher than the fitness measure in $SOL^1$ of blobs that appear only in $SOL^2$. We compute the fitness measure of the blob $O_i$ in $SOL^1$, $fm^{(I^{(1)})}(O_i)$, and the fitness measure of the blob $O_i$ in $SOL^2$, $fm^{(I^{(2)})}(O_i)$, for each blob $O_i$ of the 116 blobs in $SOL^2$. For i=0 ... 115 we compute $fm^{(I^{(1)})}(O_i)$ using Eq. 18.

Figure 18:
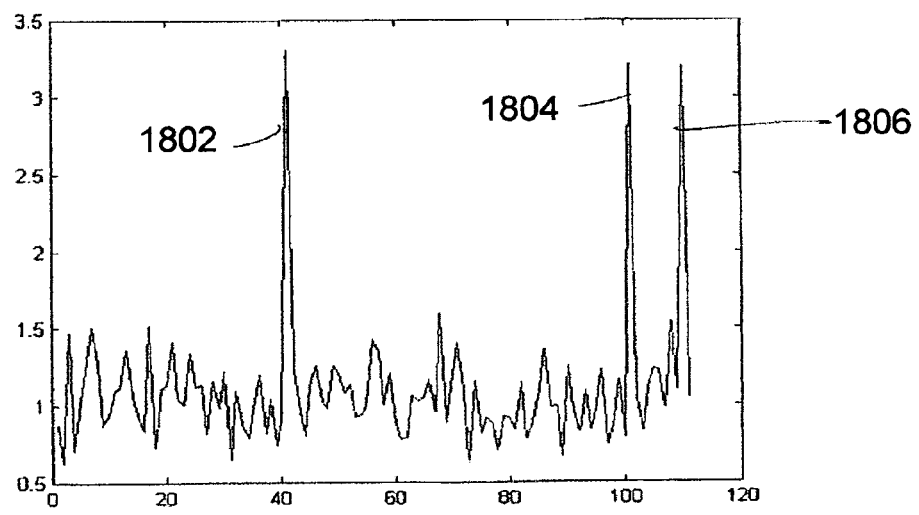
FIG. 18 shows on the x-axis the index of a blob in $SOL^2$ and on the y-axis the ratio between the fitness measures of this blob in image $I^{(2)}$ and in image $I^{(1)}$ of FIG. 17.
Figure 19:
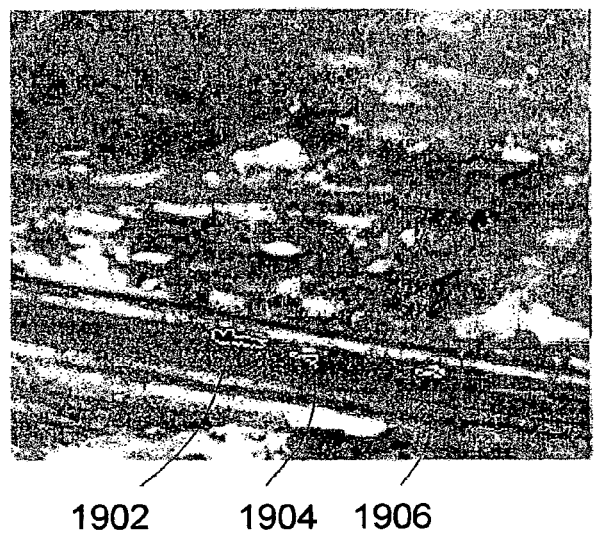
FIG. 19 shows the output of the change detection method applied on the images in FIG. 17.

FIG. 18 shows on the x-axis the ordinal number of the blob (index i) in $SOL^2$ and on the y-axis the ratio between the fitness measure of this blob in image $I^{(2)}$ and in image $I^{(1)}$ of FIG. 17, the ratio computed using Eq. 18. The three peaks 1802, 1804 and 1806 correspond to the three vehicles 1704, 1706 and 1708 that appear in $I^{(2)}$ and not in $I^{(1)}$;

FIG. 19 shows the output of the change detection algorithm applied on the images in FIG. 17. The three extracted "blobs of change" from $I^{(2)}$ (1704, 1706 and 1708) are marked by curves 1902, 1904 and 1906.

5.4 Example IV: Comparison with the "Shading Model" Method

Figure 20:
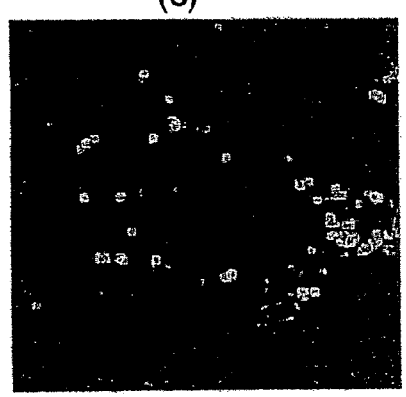
FIG. 20 shows a comparison between results of change detection using the method of the present invention, and results of the Shading Model algorithm.
Figure 20:
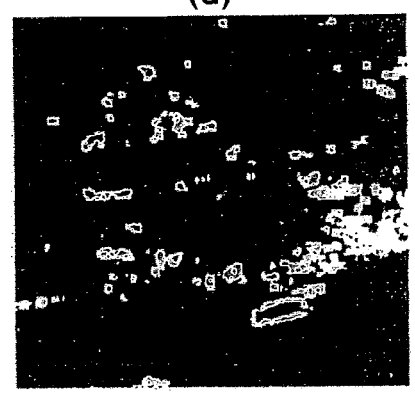

This example demonstrates the difference between the method of the present invention and the prior art "Shading Model" described above. FIG. 20 shows a comparison between the results obtained with the two methods on a pair of images: in (a) a blob of change 2002 that appears in $I^{(1)}$ and not in $I^{(2)}$ after the application present method; in (b) a blob of change 2004 that appears in $I^{(2)}$ and not in $I^{(1)}$ after the application of present method; in (c) the image of variances, which is the output of the Shading Model method, and in (d) the binary image of (c) derived by choosing the most appropriate threshold to extract blob of change 2002. From FIGS. 20(c) and (d) we can see that the Shading Model method fails to detect the change because there too many blobs that do not have a match. This happened because of the abrupt and extreme changes in illumination. The "Shading Model" method computes the variance over a window with pre-defined size. In case of a blob of change that is considerably larger than the window size, only part of the blob boundary will be detected.

In summary, the present invention introduces an efficient and robust method that provides a novel algorithm for performing change detection between a pair of registered gray-level images, under severe differences in the illumination of the images. The output of the algorithm is a set of connected components, where each component describes a "blob of change", which is a blob that exists in only one of the two images.

The time complexity of the change detection algorithm is almost linear in the image size. Therefore, it is suitable for real-time applications. The examples detailed above demonstrate its robustness even when extreme changes in the illumination exist. The main advantages of the method disclosed herein include:

a. Exact detection of the change. The method works also for noisy inputs with very small "blobs of change" (ca. 30 pixels).

b. The input images can contain several "blobs of change" with a considerable difference in their sizes. This is a consequence of the fact that the disclosed method does not use a window with pre-defined size, but works directly on the extracted blobs.

c. The detection of change is robust and insensitive to noise as long as the change is a connected blob.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for illumination-independent change detection between a pair of registered images, comprising:
   a. providing a first original gray-level image, a second original gray-level images, a first negative image related to said first original image and a second negative image related to said second original image,
   b. extracting respective pluralities of blobs from each of said first and second original images and each of said first and second negative images,
   c. matching each extracted blob in said first original and negative images with each extracted blob in said second original and negative images to obtain matched and unmatched blobs, and
   d. testing all said unmatched blobs to identify blobs of change.

2. The method of claim 1, wherein said step of extracting further includes:
   i. extracting a first plurality of blobs from said first original image, a second plurality of blobs from said second original image, a third plurality of blobs from said first negative image and a fourth plurality of blobs from said second negative image,
   ii. forming a first unified blob list by unifying said first plurality with said third plurality of blobs, and
   iii. forming a second unified blob list by unifying said second plurality with said fourth plurality of blobs.

3. The method of claim 1, wherein said step of extracting is accomplished using a modified connectivity analysis along gray-levels algorithm.

4. The method of claim 2, wherein said step of matching further includes determining if each blob in said first unified blob list has a corresponding blob in said second unified blob list, and if each blob in said second unified blob list has a corresponding blob in said first unified blob list.

5. The method of claim 4, wherein said determining includes checking overlaps of pixels.

6. The method of claim 5, wherein said overlap is about 90%.

7. The method of claim 2, wherein said step of testing includes calculating for each said unmatched blob a fitness measure, and comparing said fitness measure with a predetermined threshold to establish whether each said unmatched blob is a said blob of change.

8. The method of claim 7, wherein said substep of calculating said fitness measure includes: for each said unmatched blob:
   i. calculating a first and a second saliency in each of said first and second original images respectively,
   ii. dividing said first saliency by said second saliency to obtain a saliency ratio,
   iii. calculating a gradient distribution measure, and
   iv. setting said fitness measure being to be equal to said saliency ratio if said saliency ratio is larger than or equal to said threshold, and setting said fitness measure to be equal to the product of said saliency ratio and said gradient distribution measure if said saliency ratio is smaller than said threshold.

9. The method of claim 6, wherein said threshold has a value of about 0.6.

10. The method of claim 8, wherein said substep of calculating said first and said second saliency includes using a contour-following algorithm.

11. A method for change detection in images, comprising:
   a. providing a pair of first and second registered gray level images, wherein said step of providing further includes providing respective negative first and second images;
   b. extracting respective first and second pluralities of blobs from each of said images using a modified connectivity along gray levels (CAG) analysis, wherein said step of extracting further includes extracting a third plurality of blobs from said negative first image and a fourth plurality of blobs from said second negative image;
   c. locating at least one unmatched blob in at least one of said images, wherein said step of locating at least one unmatched blob further includes:
      i. comparing each blob from said first and third pluralities of blobs with each blob from said second and fourth pluralities of blobs,
      ii. locating corresponding blobs based on said comparison, and
      iii. identifying said at least one unmatched blob based on a pixel overlap between each pair of said corresponding blobs; and
   d. identifying at least one blob of change related to said images by applying a test on said at least one unmatched blob.

12. The method of claim 11, wherein said step of identifying said at least one blob of change by further includes checking a fitness measure to said at least one unmatched blob.

13. The method of claim 12, wherein said substep of checking said fitness measure includes: for each said at least one unmatched blob i. calculating a first and a second saliency in each of said first and second gray level images respectively,
ii. dividing said first saliency by said second saliency to obtain a saliency ratio,
iii. calculating a gradient distribution measure, and
iv. setting said fitness measure being to be equal to said saliency ratio if said saliency ratio is larger than or equal to a predetermined threshold, and setting said fitness measure to be equal to the product of said saliency ratio and said gradient distribution measure if said saliency ratio is smaller than said threshold.

14. The method of claim 13, wherein said threshold has a value of about 0.6.

15. The method of claim 14, wherein said substep of calculating said first and said second saliency includes using a contour-following algorithm.

* * * * *